United States Patent
Huang

(10) Patent No.: US 9,386,005 B2
(45) Date of Patent: Jul. 5, 2016

(54) METHOD AND SYSTEM FOR DATA COMMUNICATION OVER NETWORK

(71) Applicant: Alibaba Group Holding Limited, George Town (KY)

(72) Inventor: Mian Huang, Hangzhou (CN)

(73) Assignee: Alibaba Group Holding Limited (KY)

(*) Notice: Subject to any disclaimer, the term of this patent is extended or adjusted under 35 U.S.C. 154(b) by 0 days.

(21) Appl. No.: 14/535,726

(22) Filed: Nov. 7, 2014

(65) Prior Publication Data

US 2015/0135274 A1    May 14, 2015

(30) Foreign Application Priority Data

Nov. 13, 2013 (CN) .......................... 2013 1 0566609

(51) Int. Cl.
| | |
|---|---|
| G06F 11/30 | (2006.01) |
| G06F 12/14 | (2006.01) |
| H04L 29/06 | (2006.01) |
| H04L 29/08 | (2006.01) |
| H04L 9/32 | (2006.01) |
| H04W 4/02 | (2009.01) |
| H04W 12/08 | (2009.01) |

(52) U.S. Cl.
CPC ............... *H04L 63/08* (2013.01); *H04L 9/3228* (2013.01); *H04L 67/18* (2013.01); *H04W 4/023* (2013.01); *H04W 12/08* (2013.01)

(58) Field of Classification Search
CPC ................................ G06F 21/52; H04L 63/08
USPC .......................................................... 713/189
See application file for complete search history.

(56) References Cited

U.S. PATENT DOCUMENTS

| | | | |
|---|---|---|---|
| 7,831,828 B2 | 11/2010 | Von Arx et al. | |
| 8,407,463 B2 | 3/2013 | Ghirardi | |
| 2004/0030567 A1* | 2/2004 | Takeshita | G06F 17/3089 705/1.1 |
| 2007/0100752 A1 | 5/2007 | Wallaja et al. | |
| 2007/0136573 A1 | 6/2007 | Steinberg | |
| 2007/0239355 A1* | 10/2007 | Oh | G01C 21/005 701/431 |
| 2012/0094596 A1 | 4/2012 | Tysowski | |
| 2013/0024918 A1* | 1/2013 | Cramer | H04L 63/0838 726/6 |
| 2013/0219290 A1* | 8/2013 | Kim | H04W 4/206 715/748 |
| 2014/0101246 A1* | 4/2014 | Thammaiah | G06Q 50/01 709/204 |
| 2014/0229379 A1 | 8/2014 | Jang | |

FOREIGN PATENT DOCUMENTS

WO           2013050738           4/2013

* cited by examiner

*Primary Examiner* — Dant Shaifer Harriman
(74) *Attorney, Agent, or Firm* — Van Pelt, Yi & James LLP

(57) ABSTRACT

Embodiments of the present application relate to a method for data communication, a system for data communication, and a computer program product for data communication. A method for data communication is provided. The method includes identifying one or more first users located within a present range of a location of a second user, comparing an authorization code with one or more exchange codes pre-allocated to the one or more first users, and verifying validity of the authorization code, and in the event that, among the one or more exchange codes of the one or more first users within a definite range of the second user location, an exchange code matching the authorization code of the second user exists, and the authorization code of the second user is determined to be valid, performing a data exchange between the second user and the first user.

14 Claims, 4 Drawing Sheets

300

METHOD AND SYSTEM FOR DATA COMMUNICATION OVER NETWORK

CROSS REFERENCE TO OTHER APPLICATIONS

This application claims priority to People's Republic of China Patent Application No. 201310566609.0 entitled A DATA EXCHANGE METHOD AND SYSTEM, filed Nov. 13, 2013 which is incorporated herein by reference for all purposes.

FIELD OF THE INVENTION

The present application relates to a method and system for data communication over a network.

BACKGROUND OF THE INVENTION

Via the Internet, users can conveniently store data online. For example, personal data about users can be stored safely online and can be accessed, viewed, exchanged, etc. via terminal equipment. Regarding the data stored online, when users conventionally conduct offline data exchanges across short distances in real time, the users can exchange the data through appropriate client apps installed on the users' terminal equipment such as a mobile phone. If one user wishes to exchange data with another user, the user sends a data exchange request to a cash register and enters the appropriate registered account information in an interface displayed on the client app and then, after entering the appropriate information, initiates the data exchange. However, this approach requires at least one of the parties to enter personal information, account number, password, etc. or collect registration information. Within a period of time, the user performs many data operations and may even need to switch back and forth between user interfaces and exchanges between the two parties to perform the data exchange operation. Such an approach to offline data exchanges is not convenient, involves relatively long processing time, and has high costs. Thus, the approach is cumbersome and time-consuming, and the overall exchange process is inefficient.

BRIEF DESCRIPTION OF THE DRAWINGS

Various embodiments of the invention are disclosed in the following detailed description and the accompanying drawings.

DETAILED DESCRIPTION

Figure 1:
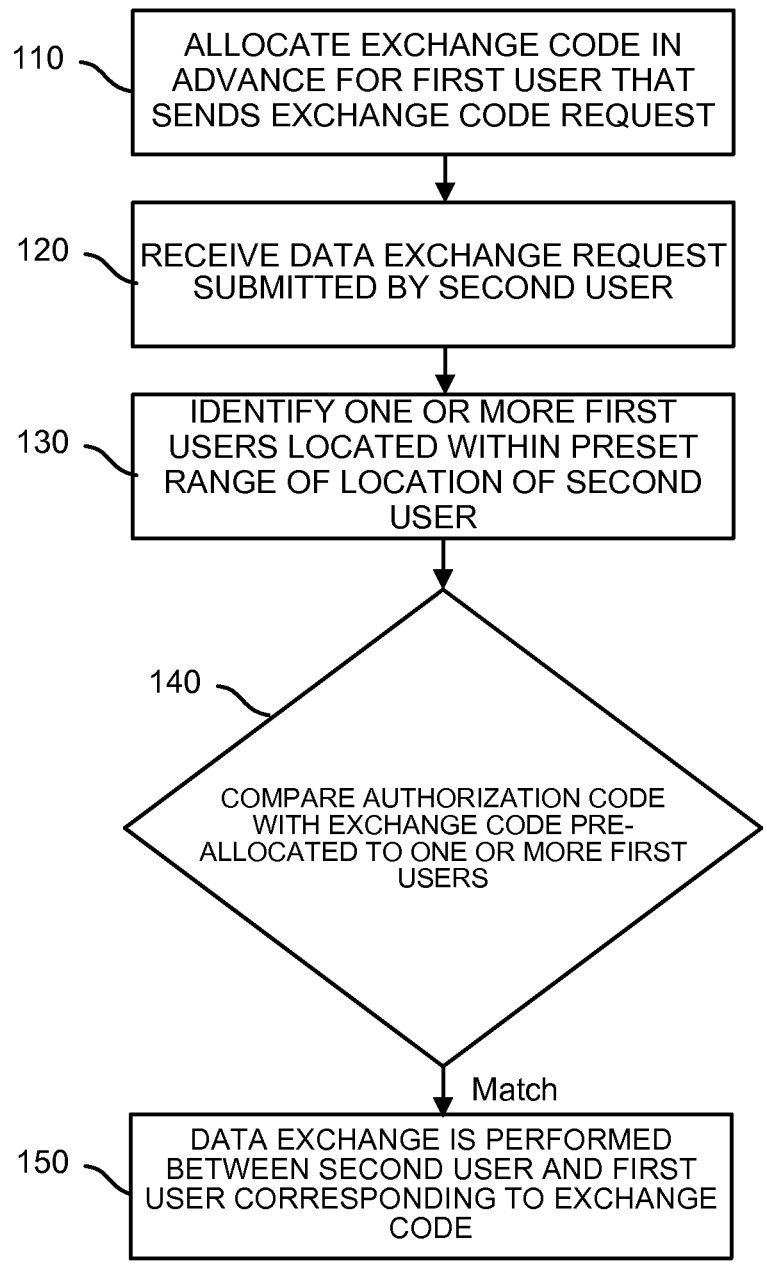
FIG. 1 is a flowchart of an embodiment of a process for exchanging data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application describes increasing the operating efficiency and security of data exchanges by combining the data exchanges with password security technology and positioning service technology. For example, before users perform a data exchange, a first user is pre-allocated an exchange code that has a valid time. An authorization code that has a valid time and that was formed based on the exchange code provided to the first user is received from a second user. The authorization code corresponds to the exchange code which the first user obtains and transmits to the second user with which the first user is engaged in data exchanges, and thus the exchange code of the first user serves as the authorization code of the second user. User location information is obtained using positioning technology. Then, one or more first users within a certain geographical range around the second user is determined based on first user location information reported by the first user and second user location information reported by the second user, and the authorization code received from the second user is compared with the pre-allocated exchange codes of the determined one or more first users. In the event that the authorization code and an exchange code match, and the matching authorization and exchange codes are both within valid times, the first user corresponding to the exchange code and the second user corresponding to the authorization code can exchange data. In the event that a matching authorization code and exchange code do not exist, or in the event that the authorization code and exchange code do not have valid times, no data exchange is performed.

Furthermore, in some embodiments, a one-time password (OTP) is used as a password security technology. For example, the one-time password is a random password that can only be used once and is subject to a valid time period and user restrictions, i.e., to be used by the user bound to (corresponding to) the one-time password within a certain period of time. This password security technology is applied, for example, to generate exchange codes and authorization codes. Positioning service technology can include Global Positioning System (GPS), location-based service technology (LBS, Location-Based Server), Wi-Fi hot spots, Bluetooth, or other such technology to determine location of users.

Furthermore, in some embodiments, acquiring Wi-Fi hotspot locations of users is performed as follows: a Basic Service Set Identifier (BSSID) broadcast of a Wi-Fi hotspot that exists around the user is acquired through a user terminal. Since the BSSID broadcast corresponds with a geographical position, the user's location information can be acquired based on this operation. In some embodiments, the user's location information is expressed in latitude and longitude. Obtaining the geographic position based on the BSSID is understood by one of ordinary skill in art and thus will not be further described for conciseness.

Furthermore, in some embodiments, users are located using Bluetooth technology. This locating can be performed through Bluetooth equipment, and accurate location information for the Bluetooth equipment already exists at the server. For example, a user searches for the Bluetooth equipment using a Bluetooth function. Then the user's location information is determined based on a location relationship of the user and the Bluetooth equipment. In some embodiments, the user's location information is expressed in latitude and longitude.

Figure 3:
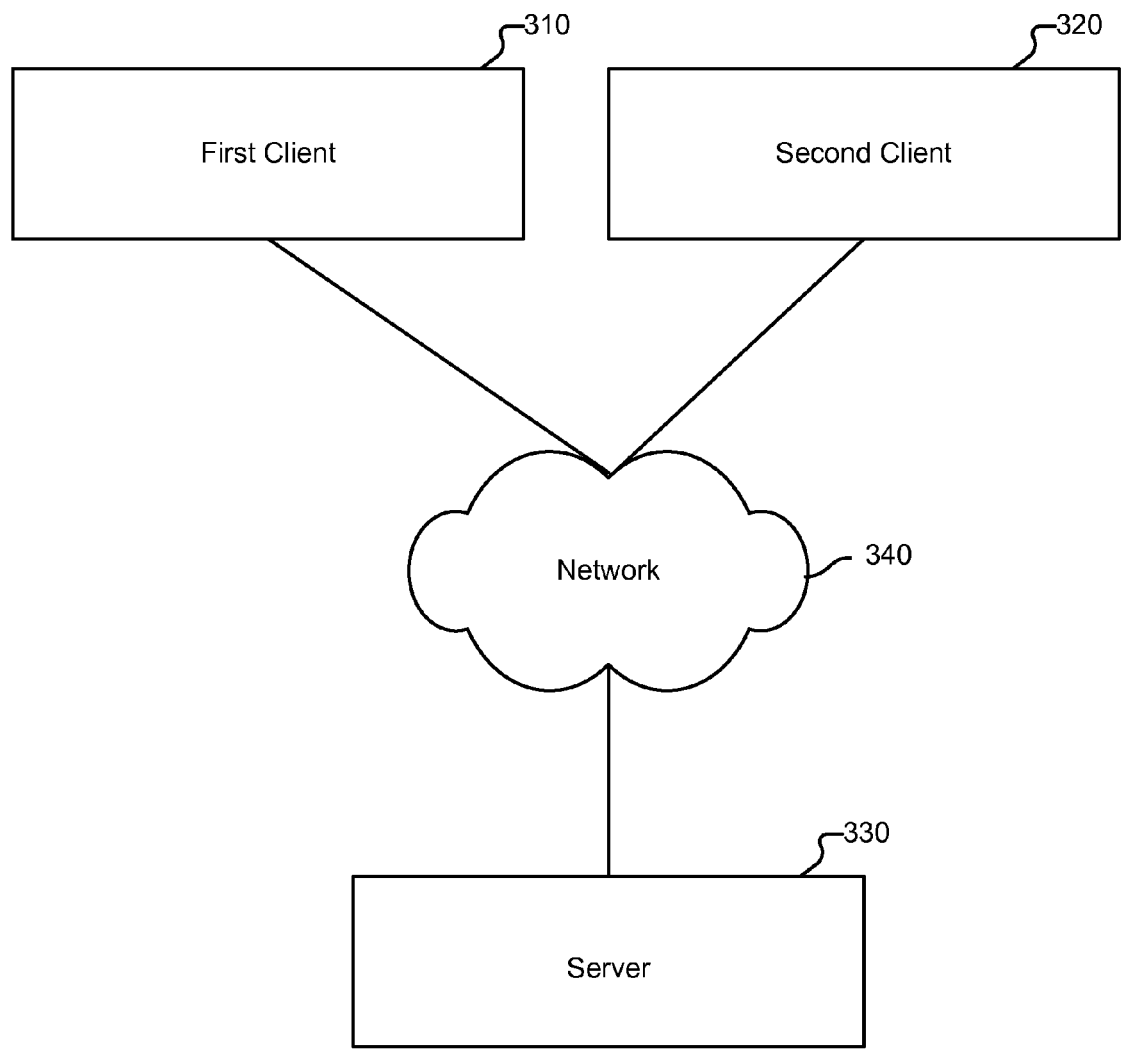
FIG. 3 is a diagram of an embodiment of a system for exchanging data.

FIG. 3 is a diagram of an embodiment of a system for exchanging data. In some embodiments, the system 300 includes a first client 310 and a second client 320 communicating with a server 330 across a network 340.

In some embodiments, a first user using the first client 310 exchanges data with a second user using the second client 330 across the network 340 via the server 330.

FIG. 1 is a flowchart of an embodiment of a process for exchanging data. In some embodiments, the process 100 is implemented by a server 330 of FIG. 3. The operations in this embodiment involve examples of Location-Based Servers and one-time passwords.

The first user's device (e.g. buyer's mobile phone) allocates an exchange code in advance for a first client device or a first client used by a first user that is to send an exchange code request to a server, and sends location information of the first client device in advance to the server. In some embodiments, one or more first clients/first users exist.

In 110, the server pre-allocates an exchange code in advance for a first client device or a first client used by a first user that is to send the exchange code request, and receives location information of the first client device in advance. In some embodiments, the server periodically receives the location of the first client device as a heartbeat. For example, the first user may send the exchange code request when the first user uses a payment application (app) on the first user's device to initiate the sending of a payment to a second user.

In some embodiments, the server obtains the first user location information based on some heartbeat.

A description of the allocation in advance of an exchange code to a first client that sends an exchange code request is provided below. In some embodiments, the exchange code is a one-time password. For example, the exchange code is the password, and upon successful authentication using the password, the first user and second user exchange data. In another example, the password whereby the first user and second user exchange data is created based on the exchange code. For example, the first user and the second user can exchange data based on the password. The first user sends an exchange code request to the server. In some embodiments, the password is used to generate the exchange code request to the server to acquire an exchange code. The user can set the exchange code as a single use code, so long as the exchange code fulfills certain requirements (e.g., the exchange code must be at least 10 digits, etc.).

In one example, before conducting data exchanges, the first user's device sends to the server an exchange code request to acquire an exchange code. In some embodiments, the exchange code request includes user identification information, such as, for example, the first user's user ID. The first user's user ID is unique with respect to the server, and by using the first user's user ID, labeling one unique first user to avoid duplicating a user ID of any first user is possible. The server can identify the user ID of the first user that sent the exchange code request based on the exchange code request. Before conducting a data exchange, the first user via the user's device pre-allocates an exchange code for the first user according to the exchange code request, and binds the exchange code to the first user (user ID). This binding includes the formation of a mapping relationship or correspondence of the exchange code with the user ID. For example, the exchange code allocated to the first user corresponds to the first user (user ID). Then, the binding relationship is stored at the server. For example, as shown in Table 1, user IDs and exchange codes are stored in correspondence with each other.

Furthermore, in some embodiments, the exchange code are represented as random data that is unique and has a valid time, and the exchange code can only be used once within a valid time by the first user bound (corresponding) to the exchange code. Furthermore, in some embodiments, the exchange code is represented as random data that is unique within a certain range and has a valid time, and which can only be used once within the valid time by the first user bound to the exchange code. In some embodiments, the random data (exchange code) includes numerical values, letters, and/or symbols. For example, the server generates an exchange code for a first user. The exchange code also includes a valid time. Within the valid time of the exchange code, another exchange code that repeats (is the same as) the exchange code within a certain time range is guaranteed not to occur. Moreover, the exchange code cannot be re-used. In other words, the exchange code is to be used only once by the first user. The "certain range" refers to a preset geographical area range. For example, Beijing corresponds to a geographical area range.

In another example, the valid time of the exchange code represents the valid time in which the exchange code is to be used. Outside of the valid time, the exchange code becomes invalid. For example, an exchange code valid time corresponds to 8 hours, and the exchange code takes effect at 1:00:00 AM on Sep. 5, 2013. The cut-off time, i.e., invalidation time, is 9:00:00 AM on Sep. 5, 2013. Therefore, if a first user who obtains the exchange code uses the exchange code at 10:00 PM on Sep. 5, 2013, the exchange code will have already exceeded the cut-off time of 9:00:00 AM on that day. In other words, the 8-hour valid time interval starting from the effective start time has already lapsed, which means that the exchange code's valid time has expired. In this example, the exchange code has ceased to be valid and is voided. Therefore, completing a data exchange with the exchange code is not possible. Furthermore, the effective start time also corresponds to the time when the server generates the exchange code based on the request, as in the above example of 1:00:00 AM on Sep. 5, 2013.

In some embodiments, the exchange code can be used only once by the first user to which it belongs. For example, after a first user who obtained the exchange code uses the exchange code to complete a data exchange, the first user cannot use the exchange code again to conduct a data exchange. The exchange code is bound to the first user that acquired the exchange code. For example, the 8-digit exchange code "12345678," which was generated by the server, is allocated to User A, whose user ID is 123. Thus, this exchange code 12345678 is bound to User A. The exchange code can be randomly generated or entered by the user. In some embodiments, the exchange code is a one-time use code.

To increase the security of data exchanges, the generation and design of the above exchange code can ensure that no user other than the first user to whom the exchange code was allocated can decode or validly use the exchange code.

In some embodiments, a user exchange code information table is generated, like Table 1, to store exchange code information pre-allocated to first users. For example, the user exchange code information table includes user IDs, exchange codes, exchange code effective start times, exchange code valid times, etc. of first users that have obtained the exchange codes.

TABLE 1

| User ID | Exchange code | Effective start time | Valid time |
|---------|---------------|----------------------|------------|
| 123 | 12345678 | 2013 Sep. 5-1:00 | 8 hours |

In the user exchange code information table presented in Table 1, a first user with the user ID 123 exists. The exchange code of the first user is 12345678, and the time when the exchange code was generated, i.e., the effective start time for the exchange code, is 20130905-1:00 (Sep. 5, 2013, 1:00:00 AM). The valid time of the exchange code is 8 hours, thus the exchange code's cutoff time is to be 9:00:00 AM on Sep. 5, 2013. In other words, the exchange code is to become invalid at 9:00 AM on Sep. 5, 2013.

A description for acquiring in advance location information reported by one or more first users, and storing the location information is provided below.

In some embodiments, location information reported by one or more first users includes geographical location information on the one or more first users. The geographical location information on the first users corresponds to locations of the one or more first users. In some embodiments, the geographical location information corresponds to global positioning information (GPS, Global Positioning System) on the one or more first users.

In some embodiments, the location information which is reported each time by a first user includes user status information. For example, the user status information includes the user ID of the first user. A correspondence is established between the location information reported by the first user and the user ID of the first user. The correspondence is stored at the server to enable the server to know the current location of the first user. The location information reported by the first user's device and the unique user ID corresponding to the first user are sent together to the server and are received by the server, which then the server acquires the location information and the user ID and stores the location information and the user ID in correspondence with each other, as shown in Table 2. In some embodiments, the server updates the stored location information based on the location information reported by the first user's device.

In some embodiments, a first user uses location-based services (LBS) technology to implement fixed-time, fixed-location reporting, or a combination thereof of location information to the server. Furthermore, in some embodiments, the first user, during the process of moving, reports their location information to the server in real time or periodically as their location changes in real time. In some embodiments, upon receiving the location information reported by the first user's device, the server updates the first user's location information stored at the server.

In some embodiments, the first user's device reports location information at fixed times includes reporting location information with time as a reference quantity based on LBS technology. For example, the first user's device periodically (at fixed times) reports location information. In another example, the first user's device reports to the server once every 10 minutes.

In some embodiments, the first user's device reports location information at fixed locations including reporting location information with a specific location as a reference quantity based on LBS technology. For example, the first user's device reports location information within a certain range (fixed location) covered by a Wi-Fi hotspot.

In addition, the first user's device can also report location information through a combination of the above fixed-time and fixed-location approaches. For example, the first user's device, according to a 10 minute cycle, periodically (fixed-time) reports location information within the range of a supermarket (fixed-location) covered by a Wi-Fi hotspot.

Based on location information reported from fixed locations, at fixed times, or a combination thereof by the first user, the server can add first user-reported location information to the user exchange code information table of Table 1 or can update or establish a corresponding user exchange code information table, as shown in Table 2.

TABLE 2

| User ID | Exchange code | Effective start time | Valid time | Location information |
|---------|---------------|----------------------|------------|----------------------|
| 123 | 12345678 | 2013 Sep. 5-1:00 | 8 hours | North longitude: 39" 26' East latitude: 115" 25' |

In Table 2, if location information reported by the first user's device is received for the first time, the server can establish a new location information row for the first user in the exchange code information table. In other words, the server can add the location information, such as north longitude 39" 26' and east latitude 115" 25' for the first user (user ID is 123). The location information can change as the first user changes location. In other words, if the reported location information is not received for the first time, the server can use the first user location information that is received (acquired) each time to update in real time the location information corresponding to the appropriate user ID in Table 2. In this way, the server can determine the current, accurate location information of the first user, i.e., the server can determine where the first user is currently located.

In an example: a first user who is using terminal equipment, such as a mobile phone user, installs a client program (an app) on the mobile phone. The mobile phone user can use the app to request an exchange code from the corresponding server. In some embodiments, the exchange code is randomly generated by the server. An example of the exchange code is an unused 8-digit number, and the 8-digit number is bound to the account number of the mobile phone user. At the same time, a valid time period of 8 hours is set for the 8-digit number. The mobile phone user client app can also display the exchange code that was obtained. In addition, changes in the geographical location of the mobile phone user can be detected through the app. Subsequently, account information and LBS information of the mobile phone user can be transmitted to the server using a fixed-time, periodic, or other approach. For example, the account information includes user id. In addition, a fixed-time approach to reporting LBS information can be employed, as for example by monitoring whether the LBS timer has timed out, and if the LBS timer has timed out, the app reports the mobile phone user location information to the server. If the LBS timer has not timed out, the app remains in standby mode.

In 120, the server receives a data exchange request submitted by a second user using a second client device or a second client, and acquires the location information of the second user (i.e., the location of the second client). In some embodiments, the data exchange request includes a message requesting data exchange processing. By acquiring the location information of the second user's device, the server can determine the location of the second user. In some embodiments, one or more second users exist.

In some embodiments, the second user location information is obtained when the second user sends or submits (sends/submits) the data exchange request, before the second user submits the data exchange request, or after the second user submits the data exchange request.

The message requesting data exchange processing (the data exchange request) includes optional identity information of the second user, an authorization code created the second user based on the exchange code transmitted by the first user's device, etc. For example, the identity information of the second user includes the user ID of the second user.

The authorization code indicates that the first user has granted authority to the second user to conduct a data exchange. In some embodiments, the authorization code serves as a password for the data exchange conducted by the first user and the second user. The first user's device transmits the pre-allocated exchange code to the second user to create an authorization code for the second user. In one approach, the second user's authorization code is created based on the exchange code transmitted by the first user's device. For example, the second user directly takes the exchange code transmitted by the first user's device as an authorization code, creates the authorization code by employing another predetermined rule such as encrypting/decoding the exchange code, or adding another identifier to exchange code. For example, an app on the first user's device encrypts the exchange code, and the server decrypts the encrypted exchange code. Thus, the second user can use the authorization code to conduct the data exchange with the first user.

As an example, before the data exchange occurs between the first user and the second user, the first user's device transmits (or notifies/sends/inputs) their exchange code to the second user's device. The second user's device creates the second user's authorization code based on the received exchange code. Thus, the second user can exchange data with the first user, or acquire data from the first user, only if the first user permits (or authorizes) the data exchange.

In one approach, the first user's device transmits (notifies/sends) the exchange code that was obtained in advance to the second user, and the exchange code serves as the second user's authorization code, i.e., a data exchange password which represents authorization from the first user to the second user and permission for the second user to obtain data from the first user.

For example, data that a second user is looking to obtain is stored on a personal online hard drive of a first user on a server. In this example, the second user can, by inputting the authorization code (exchange code) transmitted by the first user's device, send a request to the server to obtain the data from the personal online hard drive of the first user.

The second user sends their authorization code to the server so that the server can ultimately complete the data exchange based on the received authorization code to establish a communication channel between the first user's device and the second user's device. At the same time that the second user's device sends the authorization code to the server, in some embodiments, the second user's identification information, e.g., the second user's user ID, is also sent to the server to identify, based on the user ID of the second user, which second user sent the authorization code. The second user's user ID is unique, and the second user's user ID is used to label one unique second user such that no user ID of any second user is duplicated.

A description of the acquisition of the location information of the second user's device is provided below.

In some embodiments, each second user submits or reports their location information to the server. The location information of the second user's device can include geographical location information on the second user, which is used to indicate a location of the second user. In some embodiments, the geographical location information of the second user is GPS information on the second user. The server can determine the location of the second user based on the location information that was submitted for the second user. Acquiring the location information of the second user is similar to acquiring the location information of the first user described above and will not be further discussed for conciseness.

In one approach, the location information of the second user can be pre-reported by the second user. The pre-reported location information can be pre-stored in correspondence with identification information in the server to create a record of the second user. In the event that no change occurs in the location information of the second user, the server does not update the location information of the second user. In the event that the location information of the second user has changed, the location information of the second user can be resubmitted or reported for updating to the server. In the event that the server receives a message from the second user requesting data exchange processing, the server will find the second user corresponding to the identification information that has been stored and recorded in the table, find the location information recorded for the second user, and acquire the location information recorded therein, based on the identification information (e.g., user ID) in the message requesting data exchange processing. In this way, the server determines the location of the second user requesting the data exchange processing. In the event that a location of the second user is relatively fixed and does not move regularly, the location information of the second user can be pre-stored in the server in this manner. The second user is not required to report their location information thereafter, or can report their location information only when their location changes.

In another approach, the second user's device can report their location information when sending the authorization code. For example, the second user's location information is included in the message requesting data exchange processing that is to be sent and is transmitted to the server together with the authentication code and identification information. The server acquires the authorization code, the identification information, and the location information corresponding to the second user from the message requesting data exchange processing. Thus, the second user's location can be determined. Then, in the event that the location information differs from the location information that was previously recorded, the previously stored location information can be updated. As an example, Table 3 is a second user location information table stored on the server.

TABLE 3

| User ID | Location information |
| --- | --- |
| 456 | North longitude: 39" 26'<br>East latitude: 115" 25' |

Table 3 illustrates an example of a record of a correspondence between the second user and their location information, i.e., a form for storing a second user and second user location information. In the example, the second user's user ID is 456, and the location information corresponding to the second user whose user ID is 456 is north longitude 39" 26' and east latitude 115" 25'. When the location of the second user changes, the server at fixed times or in real time can update the record of the second user location information table based on the reported location information.

As an example (continuing the above example), if the mobile phone user provides a merchant (the second user) with the mobile phone user's exchange code "12345678," the merchant inputs the exchange code as an authorization code into its cash register. In other words, the authorization code is "12345678." The cash register is connected to a server. For example, the cash register can be a computer terminal that is connected to the server. Thus, the authorization code and the merchant's location information and identification information are sent to the server through the cash register. The server receives the information and locates the merchant and the corresponding location in the stored record.

In 130, the server identifies one or more first users located within a certain range or preset range of a location of the second user based on the location information of the second user and the location information of the one or more first users. For example, the server knows the location of the cash register, and the server identifies the first users because, for example, the users' mobile phones are periodically sending heartbeats including location information to the server. Thus, for example, to find a first user, the server can search for users within a radius of 50 feet of the cash register.

In some embodiments, the "certain range" relating to the location of the second user is based on a geographical area range to be preset, similar to the preset geographical area range referred to during the above allocation of the exchange code. For example, if the second user is a relatively large supermarket, the supermarket is to occupy a relatively large site. Thus, based on the size of the site occupied by the supermarket, a circular area having a radius of 500 meters and a center at the central point of the circular area relating to the supermarket can be set as the certain range for the second user.

Since the location information of each first user and the location information of the second user has already been stored or acquired by the server, the location information of one or more first users and the location information of the second user that sent the data exchange request can be compared to determine the one or more first users within the certain range of the location of the second user. In other words, the search for the one or more first users is performed within the preset geographical area range based on the location of one second user. As an example, location information from one first user is compared with the location information from the second user. In the event that the location indicated by the one first user location information falls within the preset geographic area range for the location indicated by the second user location information, the server confirms the one first user as being within the certain range of the second user location.

For example, the second user location information corresponds to longitude 120.1262, latitude 30.2619. The stored first user location information includes the following: First User A location information corresponds to longitude 120.1272, latitude 30.2629; First User B location information corresponds to longitude 120.1292, latitude 30.2609; and First User C location information corresponds to longitude 120.1262, latitude 30.2719. In the event that the second user location information is the center of a circle, and the area is set to have a range of a 500 m radius, First User A and First User B are located within the 500 m range around the second user, and First User C is located outside the 500 m range around the second user.

In the example of the application (continuing the above example), from the location of the merchant (e.g., the merchant's cash register), the server conducts a search for mobile phone users nearby based on a geographic location.

In 140, the server compares the authorization code in the received message requesting a data exchange submitted by the second user with the exchange code pre-allocated to the one or more first users having a location within the certain range of the second user location, and verifies validity of the authorization code matched with the exchange code. In some embodiments, the server determines the exchange code matched with (e.g., is the same as or satisfy certain preset rules or conditions) the authorization code of the second user and confirms the validity of the authorization code. Thus, the server is subject to determining a first user corresponding to the exchange code.

Since the first user and the exchange code corresponding (bound) to the first user are stored in advance, by determining the one or more first users located within the certain range of the second user location, the server is subject to knowing the exchange code bound to each first user among the one or more first users.

In some embodiments, the second user authorization code is matched against the one or more first user exchange codes. In performing the comparison, the exchange codes of the one or more first users are searched based on the authorization code of the second user. The ratio of the authorization code to the searched exchange codes is 1:n. The authorization code is used as a search term in searching among the n exchange codes, where n corresponds to a natural number.

As used herein, matching refers to the matched authorization code and exchange code having the same content or the matched authorization code and exchange code comply with a preset rule. In the event that a match between the authorization code and an exchange code exists, i.e., if a relevant exchange code is found based on a search criterion, the match indicates that the corresponding first user exists. For example, when the authorization code of the second user is a directly used pre-acquired exchange code sent by a first user to the second user, the matched authorization code and the exchange code exists, i.e., the authorization code and the exchange code have the same content. Subsequently, if a determination that a matched authorization code and exchange code exists, the records in Tables 1 and 2 can be referenced to determine the first user bound to the matched exchange code. The preset rule is used to prevent the existence of duplicate codes so that if a person is traveling, within 20 minutes, in 20 km radius, there is only 1 such code.

If a matched authorization code and exchange code does not exist, i.e., if the search for a relevant exchange code fails and there does not exist an exchange code with the same content or no exchange code that conforms to a certain rule, etc., an error in the authorization code provided by the second user's device exists or the first user that provided the exchange code to the second user to create its authorization code does not exist within the certain range of the second user, etc. Furthermore, in the event that no matched authorization code and exchange code exists, the authorization code is considered invalid. As a result, the server will notify the second user that the data exchange request failed, and the data exchange process flow ends.

In addition, the validity of the authorization code can be verified. In some embodiments, the matching operation can be conducted first. When an exchange code that matches the authorization code of the second user exists, the validity of the authorization code is verified. Thereupon, if the authorization code can be verified and the authorization code is determined to be invalid, the data exchange process flow ends. If, when the comparison is performed first, an exchange code that matches the authorization code of the second user does not exist, the authorization code is no longer considered valid, and the data exchange process flow ends.

As an example, in the event that the exchange code transmitted by the first user's device directly serves as the authorization code of the second user, when the server receives the authorization code of the second user, or when the server determines that a matched authorization code and exchange code exists, the authorization code can be verified to determine whether the time is within the valid time period, i.e., the authorization code's validity is verified.

In this example, the exchange code that the second user receives from the first user is sent to the server directly as an authorization code. When the exchange code of one first user among the one or more first users located within a certain range of the second user geographical location is matched with the authorization code of the second user (e.g., content is consistent/same/equivalent), the validity of the authorization code still is to be verified. In the event that the authorization code is not within the valid time period, the data exchange process flow ends. In the event that the authorization code is within the valid time period, a matching exchange code exists and the time is within the valid time period. Thus, the data exchange process flow can proceed.

In some embodiments, verifying whether the authorization code is valid includes comparing the authorization code upload time with a cut-off time of the exchange code matching the authorization code. The authorization code upload time determined when the exchange code is generated. In the event that the authorization code upload time is less than or equal to the cut-off time, the authorization code is valid. In the event that the upload time of the authorization code is greater than (exceeds) the cut-off time, the authorization code is determined to be invalid. Regarding the cut-off times, or the valid cut-off time points, the corresponding time points are obtained by adding the valid time to the effective start time for example, Tables 1 and 2, can serve as the cut-off time for the exchange codes. Relating to an example of a matched exchange code: After the authorization code and the exchange code are matched, the content shown in Tables 1 and 2 form the basis for 1+8=9, whereby the valid time of the exchange code is determined to expire at 9:00 AM on Sep. 5, 2013. Similarly, the valid time of the authorization code also expires at 9:00 AM on Sep. 5, 2013. Thus, if the server receives the authorization code after 9:00 AM on Sep. 5, 2013, e.g., at 10:00 AM, 9 hours would have elapsed from the exchange code effective start time at 1:00 AM until 10:00 AM, which would exceed the valid time of 8 hours. In other words, the time would fall outside the valid time for the exchange code, as shown in Tables 1 and 2. Expiration of the exchange code corresponds to expiration (invalidation) of the authorization code. In other words, in the event that the exchange code is successfully matched, but the exchange code has expired, the authorization code has also expired. Thus, the data exchange cannot be performed, and the process flow ends. Furthermore, in some embodiments, the exchange code and corresponding first user information are deleted from Tables 1 and 2. Of course, in the event that the time when the authorization code is received is 8:00 on that day, both the matched exchange code and the authorization code are valid, and control may proceed to operation 150 and execute the data exchange process for the second user and the corresponding first user with the matched exchange code.

By using unique exchange codes, the process can avoid the occurrence of duplicate exchange codes. In particular, the process can avoid a situation where two first users within the range of the second user's location have the same exchange codes. In other words, the following problem can be avoided: Because when First Users A and B both have the exchange code 12345678, it is impossible to determine with which first user a data exchange should be conducted.

In another situation, the exchange code can have unique random data within a certain range. The exchange code has a valid time and within this valid time, the exchange code can only be used once by the first user bound to the exchange code. This certain range can be a preset geographical area range, such as the Beijing area or the Tianjin area. Thus, random number-generated exchange codes in different ranges can be the same. Therefore, when exchange codes are being compared with an authorization code, a plurality of exchange codes that are the same as the authorization code within the certain range of the second user location can exist. In other words, many exchange codes that are the same, such as identical invalid exchange codes that were not deleted from the server or identical exchange codes carried into the local area from another area can exist. To avoid having the server perform erroneous data exchanges between one or more first users and the second user in such cases, the server can also send a verification message to the second user when the server has matched a plurality of identical exchange codes. The server verifies the identity of the one or more first users that are to perform data exchanges with the second user to determine which of the first users among the one or more first users bound to the same exchange code are to perform a data exchange with the second user. The verification message can be a request for the first user that transmitted the exchange code to the second user to provide the first user's identification information, such as the user ID of the first user. In other words, the verification message is provided to the user that is verified by the server. The server determines the first user to conduct a data exchange based on the user ID of the first user.

In an example, the second user receives an exchange code from the first user and transmits the received exchange code as an authorization code, such as the authorization code 12345678, to the server to request a data exchange. The authorization code can be compared with the exchange codes of Users A and B. If the authorization code is sent at 7:00 AM, and if User A's cut-off is 9:00 AM while User B's cut-off is 6:00 AM, User B's exchange code will have already expired (7:00 AM is past 6:00 AM) since the exchange code has an expiration time (Tables 1 and 2). The exchange code that is actually valid is the exchange code of User A. In other words, when a validity verification is performed on the as yet undeleted invalid exchange and authorization codes of User B with its expired exchange code, User B's invalid authorization code and exchange code can be eliminated. No data exchange can be performed with First User B, who sent the invalid exchange code. Data exchanges are only performed with Users having exchange codes that are still valid. Thus, the server can verify whether the first users are first users having stored exchange codes that are still valid and thereby ensure the data security of first users with valid exchange codes and avoid unauthorized data exchanges.

In another example, First User C in a different geographical zone range enters another geographical zone range, coincidentally First User C has the same exchange code as First User D, and both First Users C and D are within a certain range of the same second user. As soon as the second user takes the obtained exchange code and transmits the exchange code as an authorization code to the server, the server will match the two exchanges codes of First Users C and D. Then, the server will issue a verification message to the second user requesting that the first users that provided the exchange codes to the second user provide their user ID to determine with which first user to conduct the data exchange.

The process flow ends (the data exchange process flow ends). In other words, the server refuses to execute a data exchange between the first user corresponding to the exchange code matched with the authorization code and the second user. In some embodiments, the user is notified that the data exchange failed. Of course, once the authorization code has been determined to be valid and a matched exchange code is present at the same time, the subsequent data exchange may be performed in operation 150.

In the case of an unsuccessfully matched first user exchange code, i.e., no exchange code matching the authorization code exists, or if the authorization code has been determines to be invalid, for example, beyond the valid time or has passed the valid time, then the first user and second user may receive an "Operation failed" alert. Thus, the data exchange is refused, and the process flow ends.

In an example (continuing the above example), the server searches for the exchange code corresponding to the authorization code of the merchant (such as the merchant's cash register) (e.g., the exchange code is identical to the authorization code) in information stored in the server relating to nearby mobile phone users that the server has located. In other words, the server performs comparisons, and a match is successfully found. In other words, the authorization code is matched with the same exchange code, and the exchange code is unexpired. The next operation of processing can be performed, such as deducting funds from the mobile phone account corresponding to the exchange code. In the event that no match exists or in the event that verification is unsuccessful, the process flow ends and a failure or "Unable to transact" message is returned to the merchant cash register, the mobile phone user, or a combination thereof.

In 150, in the event that the exchange code of one first user among the one or more first users failing within a definite range of the second user location is matched with the authorization code of the second user and the authorization code of the second user is valid, a data exchange is performed between the second user and the one first user corresponding to the exchange code matched with the second user authorization code.

Since the exchange code has been determined to match the authorization code and the corresponding first user has also been determined, a data exchange connection can be established (a data exchange channel is established) between the second user that sent the authorization code and the first user bound to the matched exchange code.

The second user can obtain desired data from the first user after establishing a connection. Furthermore, in some embodiments, after a first user and the second user establish the connection, the server still receives a data request from the second user. The second user sending the data request would like to obtain data from the first user. In some embodiments, the server transfers data of the first user corresponding to the data request from the first user to the second user based on the data request. In some embodiments, the server transfers the second user data to the first user based on the established channel and the data request received from the first user. Thereupon, when the server successfully transfers the first user data to the second user, the server can notify the first user and the second user with a "Data exchange successful" notice. In addition, for security purposes, the exchange code and the authorization code, in addition to having single-use invalidation, i.e., they can only be used once, also have an expiration time (e.g., 8 hours described above). The single-use invalidation and the expiration time allow a sufficiently small quantity or capacity of exchange codes/authorization codes within a preset coverage range of the second user geographical location. For example, the quantity of first users near the second user is 100. Moreover, the probability is very small that all 100 first users apply for an 8-digit exchange code/authorization code, which corresponds to one out of 10 to the 8th power=1/100000000. In other words, a very low probability that a first user and a second user would simultaneously be in nearby locations and also could be subjected to forced decoding exists.

In the above process, the first users can apply for (request) exchange codes at any time and in any location. The first users only carry the exchange code, and if the first users use the exchange code while the exchange code has not expired, the first users can engage in data exchanges with the second user. For example, before going to a department in a supermarket, a first user obtains an exchange code. After shopping, the first user's device transmits the exchange code to the second user. For example, the exchange code is input into a cash register. The cash register regards the exchange code as an authorization code, and the cash register sends the authorization code and the amount to be deducted from the first user account to the server. The server establishes a data exchange channel between a first user account and a second user account, deducts the appropriate amount from the account of the first user, and adds the appropriate amount to the account of the second user. The first user and the second user do not need to engage in large-volume data operations in this process. The large-volume data operation tasks of the data exchange (payment) process are completed by the server, which reduce data exchange time and increase data exchange efficiency.

Figure 2:
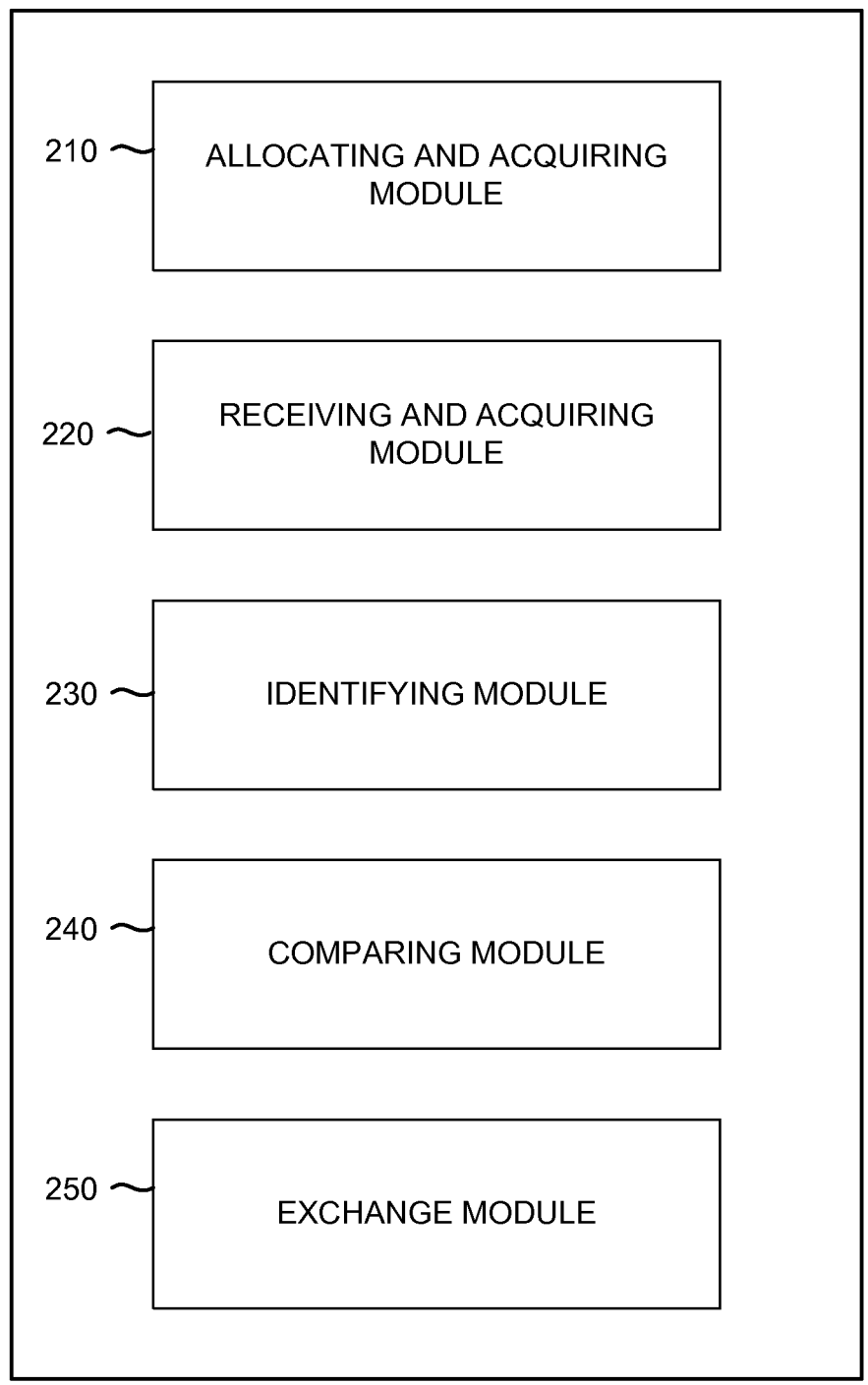
FIG. 2 is a structural diagram of an embodiment of a device for exchanging data.

FIG. 2 is a structural diagram of an embodiment of a device for exchanging data. In some embodiments, the device 200 implements the process 100 of FIG. 1 and comprises an allocating and acquiring module 210, a receiving and acquiring module 220, an identifying module 230, a comparing module 240, and an exchange module 250.

In some embodiments, the allocating and acquiring module 210 pre-allocates exchange codes to first users who send exchange code requests and pre-acquires location information of the first users. In some embodiments, the exchange code represents unique random data and has a valid time. Moreover, within the valid time, the exchange code can only be used once by a first user bound to the exchange code. In addition, the exchange code can include random data unique within a certain range. The exchange code has a valid time and within the valid time, the exchange code can only be used once by the first user bound to the exchange code.

In some embodiments, the receiving and acquiring module 220 receives a data exchange request (a message requesting data exchange processing) submitted by the second user's device and acquires location information of the second user.

In some embodiments, the identifying module 230 identifies one or more first users within a certain range or a pre-defined range of a location of the second user based on the location information of the second user and the location information of the one or more first users. "Certain ranges" include preset geographic area ranges. Furthermore, location information from the first users is compared to the second user location information. In the event that the location indicated by the first user location information falls within the geographic area range preset for the location indicated by the second user location information, one or more first users having locations within the geographic area range preset for the location indicated by the second user location information are confirmed as the one or more first users within the certain range of the second user location.

In some embodiments, the comparing module 240 compares an authorization code in the data exchange request received from the second user's device with the exchange code pre-allocated to the one or more first users who are located within the certain range of the second user location, and verifies the validity of the authorization code. The authorization code in the data exchange request of the second user is created based on the exchange code pre-allocated to the first user. The data exchange process flow ends when none of the exchange codes of the one or more first users located within a certain range of the second user location matches the second user authorization code or when the second user authorization code is determined to be invalid. Furthermore, the comparison can be performed first in the comparing and validating process. When an exchange code that matches the authorization code of the second user exists, the validity of the authorization code is verified. If the authorization code is determined to be invalid, the data exchange process flow ends. If, when the comparing is performed first, an exchange code that matches the authorization code of the second user does not exist, the authorization code is not verified, and the data exchange process flow ends. Furthermore, the upload time for the authorization code is compared to the cut-off time of the exchange code matched with the authorization code. If the authorization code upload time is less than or equal to the cut-off time, then the authorization code is determined to be valid.

In some embodiments, the exchange module 250 executes a data exchange between the second user and the first user corresponding to the exchange code matched with the second user authorization code when: the exchange code of a first user among the one or more first users within a definite range of the second user location is matched with the authorization code of the second user, and the authorization code of the second user is determined to be valid.

The modules described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

Figure 4:
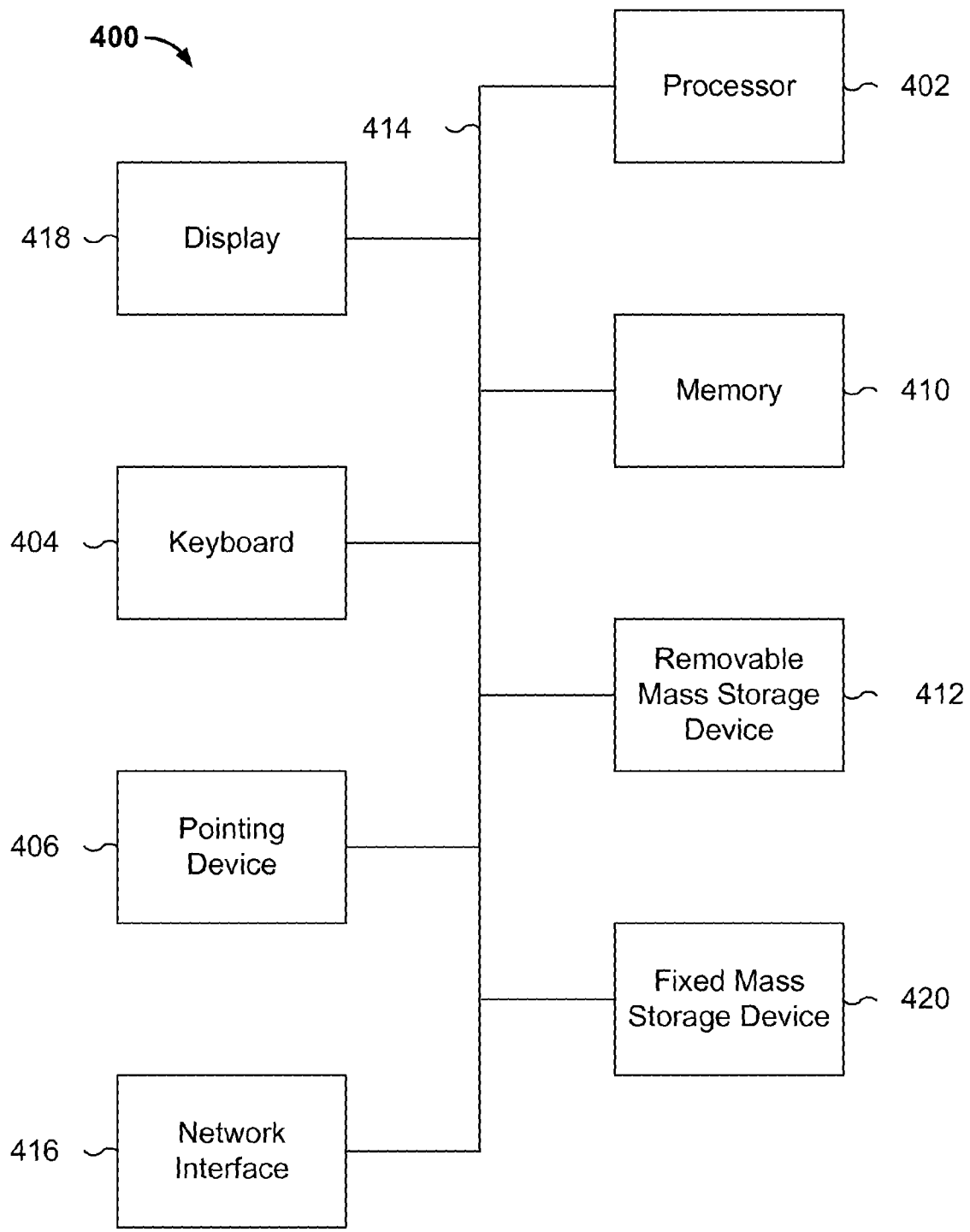
FIG. 4 is a functional diagram illustrating an embodiment of a programmed computer system for exchanging data.

FIG. 4 is a functional diagram illustrating an embodiment of a programmed computer system for exchanging data. As will be apparent, other computer system architectures and configurations can be used to perform data exchange. Computer system 400, which includes various subsystems as described below, includes at least one microprocessor subsystem (also referred to as a processor or a central processing unit (CPU)) 402. For example, processor 402 can be implemented by a single-chip processor or by multiple processors. In some embodiments, processor 402 is a general purpose digital processor that controls the operation of the computer system 400. Using instructions retrieved from memory 410, the processor 402 controls the reception and manipulation of input data, and the output and display of data on output devices (e.g., display 418).

Processor 402 is coupled bi-directionally with memory 410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 402. Also as is well known in the art, primary storage typically includes basic operating instructions, program code, data and objects used by the processor 402 to perform its functions (e.g., programmed instructions). For example, memory 410 can include any suitable computer-readable storage media, described below, depending on whether, for example, data access needs to be bi-directional or uni-directional. For example, processor 402 can also directly and very rapidly retrieve and store frequently needed data in a cache memory (not shown).

A removable mass storage device 412 provides additional data storage capacity for the computer system 400, and is coupled either bi-directionally (read/write) or uni-directionally (read only) to processor 402. For example, storage 412 can also include computer-readable media such as magnetic tape, flash memory, PC-CARDS, portable mass storage devices, holographic storage devices, and other storage devices. A fixed mass storage 420 can also, for example, provide additional data storage capacity. The most common example of mass storage 420 is a hard disk drive. Mass storage 412, 420 generally store additional programming instructions, data, and the like that typically are not in active use by the processor 402. It will be appreciated that the information retained within mass storage 412 and 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display monitor 418, a network interface 416, a keyboard 404, and a pointing device 406, as well as an auxiliary input/output device interface, a sound card, speakers, and other subsystems as needed. For example, the pointing device 406 can be a mouse, stylus, track ball, or tablet, and is useful for interacting with a graphical user interface.

The network interface 416 allows processor 402 to be coupled to another computer, computer network, or telecommunications network using a network connection as shown. For example, through the network interface 416, the processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect the computer system 400 to an external network and transfer data according to standard protocols. For example, various process embodiments disclosed herein can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow the processor 402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 4 is but an example of a computer system suitable for use with the various embodiments disclosed herein. Other computer systems suitable for such use can include additional or fewer subsystems. In addition, bus 414 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for data communication over a network, comprising:
    identifying one or more first users located within a preset range of a location of a second user, the identification being based on second user location information and first user location information;
    comparing an authorization code in a data request received from the second user with one or more exchange codes pre-allocated to the one or more first users who are located within the preset range of the location of the second user;
    verifying validity of the authorization code, comprising:
        comparing an upload time for the authorization code with a cut-off time of an exchange code in the one or more exchange codes that matches the authorization code; and
        in the event that the upload time of the authorization code is less than or equal to the cut-off time, determining the authorization code to be valid;
    in the event that, among the one or more exchange codes pre-allocated to the one or more first users who are located within the preset range of the location of the second user, an exchange code that matches the authorization code exists, and the authorization code is determined to be valid:
        establishing a data exchange channel over a communications network between the second user and one of the one or more first users pre-allocated with the exchange code that matches the authorization code; and
        performing a data exchange over the data exchange channel between the second user and the first user corresponding to the exchange code that matches the authorization code; and
    in the event that an exchange code that matches the authorization code does not exist or the authorization code is determined to be invalid, refusing a data exchange between the second user and the first user.

2. The method as described in claim 1, wherein:
    the preset range comprises a preset geographic area range; and
    the identifying of the one or more first users located within the preset range of the location of the second user based on the second user location information and the first user location information further comprises:
        comparing the first user location information from the one or more first users with the second user location information; and
        in the event that a location indicated by the first user location information falls within the preset geographic area range for the location indicated by the second user location information, confirming a first user having the first user location information within the preset geographic area range as a first user within the preset range of the location of the second user.

3. The method as described in claim 1, further comprising:
    ending the data exchange in the event that none of the one or more exchange codes of the one or more first users located within the preset range of the location of the second user matches the authorization code or the authorization code is determined to be invalid.

4. The method as described in claim 1, wherein:
    in the event that the exchange code matching the authorization code exists:
        verifying the validity of the authorization code; and
        in the event that the authorization code is determined to be invalid, ending the data exchange; and
    in the event that the exchange code that matches the authorization code does not exist:
        omitting verifying the validity of the authorization code; and
        ending the data exchange.

5. The method as described in claim 1, wherein:
    the exchange code represents unique data, has a valid time, and is subject to only one use by a first user bound to the exchange code within the valid time; or
    the exchange code representing unique random data within a certain range, having a valid time, and being subject to only one use by a first user bound to the exchange code within the valid time.

6. A method for data communication over a network, comprising:
    identifying one or more first users located within a preset range of a location of a second user based on second user location information and first user location information;
    comparing an authorization code in a data request received from the second user with one or more exchange codes pre-allocated to the one or more first users who are located within the preset range of the location of the second user;

verifying validity of the authorization code;

in the event that, among the one or more exchange codes of the one or more first users within a definite range of the location of the second user, an exchange code matching the authorization code exists, and the authorization code is determined to be valid:

establishing a data exchange channel over a communications network between the second user and a first user corresponding to the exchange code matched with the authorization code; and performing a data exchange over the data exchange channel between the second user and the first user corresponding to the exchange code matched with the authorization code, wherein the authorization code is created based on the exchange code pre-allocated to the first user; and in the event that an exchange code matching the authorization code does not exist or the authorization code is determined to be invalid, refusing a data exchange between the second user and the first user.

7. A system for data communication over a network, comprising:

a processor; and a memory coupled with the processor, wherein the memory is configured to provide the processor with instructions which when executed cause the processor to:

identify one or more first users located within a preset range of a location of a second user, the identification being based on second user location information and first user location information;

compare an authorization code in a data request received from the second user with one or more exchange codes pre-allocated to the one or more first users who are located within the preset range of the location of the second user;

verify validity of the authorization code, comprising to:

compare an upload time for the authorization code with a cut-off time of an exchange code in the one or more exchange codes that matches the authorization code; and in the event that the upload time of the authorization code is less than or equal to the cut-off time, determine the authorization code to be valid;

in the event that, among the one or more exchange codes pre-allocated to the one or more first users who are located within the preset range of the location of the second user, an exchange code that matches the authorization code, and the authorization code is determined to be valid:

establish a data exchange channel over a communications network between the second user and one of the one or more first users pre-allocated with the exchange code matched with the authorization code; and perform a data exchange over the data exchange channel between the second user and the first user corresponding to the exchange code that matches the authorization code; and in the event that an exchange code that matches the authorization code does not exist or the authorization code is determined to be invalid, refuse a data exchange between the second user and the first user.

8. The system as described in claim 7, wherein:

the preset range comprises a preset geographic area range; and the identifying of the one or more first users located within the preset range of the location of the second user based on the second user location information and the first user location information, further comprises:

compare the first user location information from the one or more first users with the second user location information; and in the event that a location indicated by the first user location information falls within the preset geographic area range for the location indicated by the second user location information, confirm a first user having the first user location information within the preset geographic area range as a first user within the preset range of the location of the second user.

9. The system as described in claim 7, wherein the memory is further configured to provide the processor with instructions which when executed cause the processor to:

end the data exchange in the event that none of the one or more exchange codes of the one or more first users located within the preset range of the location of the second user matches the authorization code or the authorization code is determined to be invalid.

10. The system as described in claim 7, wherein:

in the event that the exchange code matching the authorization code exists:

verify the validity of the authorization code; and in the event that the authorization code is determined to be invalid, end the data exchange; and in the event that the exchange code that matches the authorization code does not exist:

omit verifying the validity of the authorization code; and end the data exchange.

11. The system as described in claim 7, wherein:

the exchange code represents unique data, has a valid time, and is subject to only one use by a first user bound to the exchange code within the valid time; or the exchange code representing unique random data within a certain range, having a valid time, and being subject to only one use by a first user bound to the exchange code within the valid time.

12. A system for data communication over a network, comprising:

a processor; and a memory coupled with the processor, wherein the memory is configured to provide the processor with instructions which when executed cause the processor to:

identify one or more first users located within a preset range of a location of a second user based on second user location information and first user location information;

compare an authorization code in a data request received from the second user with one or more exchange codes pre-allocated to the one or more first users who are located within the preset range of the location of the second user verify validity of the authorization code;

in the event that, among the one or more exchange codes of the one or more first users within a definite range of location of the second user, an exchange code matching the authorization code exists, and the authorization code is determined to be valid:

establish a data exchange channel over a communications network between the second user and the first user corresponding to the exchange code matched with the authorization code; and perform a data exchange over the data exchange channel between the second user and the first user corresponding to the exchange code matched with the authorization code, wherein the authorization code is created based on the exchange code pre-allocated to the first user; and in the event that an exchange code matching the authorization code does not exist or the authorization code is determined to be invalid, refuse a data exchange between the second user and the first user.

13. A computer program product for data communication over a network, the computer program product being embodied in a tangible non-transitory computer readable storage medium and comprising computer instructions for:

identifying one or more first users located within a preset range of a location of a second user based on second user location information and first user location information;

comparing an authorization code in a data request received from the second user with one or more exchange codes pre-allocated to the one or more first users who are located within the preset range of the location of the second user;

verifying validity of the authorization code;

in the event that, among the one or more exchange codes of the one or more first users within a definite range of the location of the second user, an exchange code matching the authorization code exists, and the authorization code is determined to be valid:

establishing a data exchange channel over a communications network between the second user and a first user corresponding to the exchange code matched with the authorization code; and performing a data exchange over the data exchange channel between the second user and the first user corresponding to the exchange code matched with the authorization code, wherein the authorization code in the data request of the second user is created based on the exchange code pre-allocated to the first user; and in the event that an exchange code matching the authorization code does not exist or the authorization code is determined to be invalid, refusing a data exchange between the second user and the first user.

14. A computer program product for data communication over a network, the computer program product being embodied in a non-transitory computer readable storage medium and comprising computer instructions for:

identifying one or more first users located within a preset range of a location of a second user, the identification being based on second user location information and first user location information;

comparing an authorization code in a data request received from the second user with one or more exchange codes pre-allocated to the one or more first users who are located within the preset range of the location of the second user;

verifying validity of the authorization code, comprising:

comparing an upload time for the authorization code with a cut-off time of an exchange code in the one or more exchange codes that matches the authorization code; and in the event that the upload time of the authorization code is less than or equal to the cut-off time, determining the authorization code to be valid;

in the event that, among the one or more exchange codes pre-allocated to the one or more first users who are located within the preset range of the location of the second user, an exchange code that matches the authorization code exists, and the authorization code is determined to be valid:

establishing a data exchange channel over a communications network between the second user and one of the one or more first users pre-allocated with the exchange code matched with the authorization code; and performing a data exchange over the data exchange channel between the second user and the first user corresponding to the exchange code that matches the authorization code; and in the event that an exchange code that matches the authorization code does not exist or the authorization code is determined to be invalid, refusing a data exchange between the second user and the first user.

* * * * *